United States Patent
Hicks

(10) Patent No.: US 6,275,282 B1
(45) Date of Patent: *Aug. 14, 2001

(54) PHOTOGRAPHIC PRINTER

(76) Inventor: Ray Hicks, 2605 Corunna Rd., Flint, MI (US) 48503

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,871
(22) Filed: Feb. 12, 1998
(51) Int. Cl.[7] .................... G03B 27/52; G03B 27/72; G02B 7/02
(52) U.S. Cl. ............................ 355/40; 355/71; 359/819
(58) Field of Search .................... 355/75, 28, 46, 355/72, 73, 55, 54, 40, 27, 71; 359/819

(56) References Cited

U.S. PATENT DOCUMENTS

| | | |
|---|---|---|
| 3,511,565 | 5/1970 | Harman, Jr. et al. . |
| 4,583,845 | 4/1986 | Lucht et al. . |
| 4,961,802 * | 10/1990 | Otsuki et al. ................ 359/819 |
| 5,045,877 | 9/1991 | Lucht et al. . |
| 5,097,289 * | 3/1992 | Lucht et al. ................ 355/55 |
| 5,099,275 | 3/1992 | Hicks . |
| 5,162,843 * | 11/1992 | Clapp ........................ 355/46 |
| 5,739,897 * | 4/1998 | Frick et al. ................ 355/40 |
| 6,014,201 * | 1/2000 | Adolphi et al. ............ 355/40 |

* cited by examiner

Primary Examiner—Russell Adams
Assistant Examiner—Peter B. Kim
(74) Attorney, Agent, or Firm—Young & Basile, P.C.

(57) ABSTRACT

A photographic printer including a lamp, a film transport positioned over the lamp and coacting with the lamp to define an optical axis, a photographic paper drive positioned over the film transport, and a lens deck positioned between the film transport and the photographic paper drive. The lens deck comprises a plurality of lens carriages mounted at respective levels on the optical axis for linear movement in parallel directions generally normal to the optical axis. A plurality of laterally spaced lens assemblies are positioned on each carriage at different levels with respect to the optical axis. The various carriages are selectively moved along their respective linear paths to bring a lens assembly corresponding to a particular film size and a particular print size into alignment with the optical axis.

25 Claims, 9 Drawing Sheets

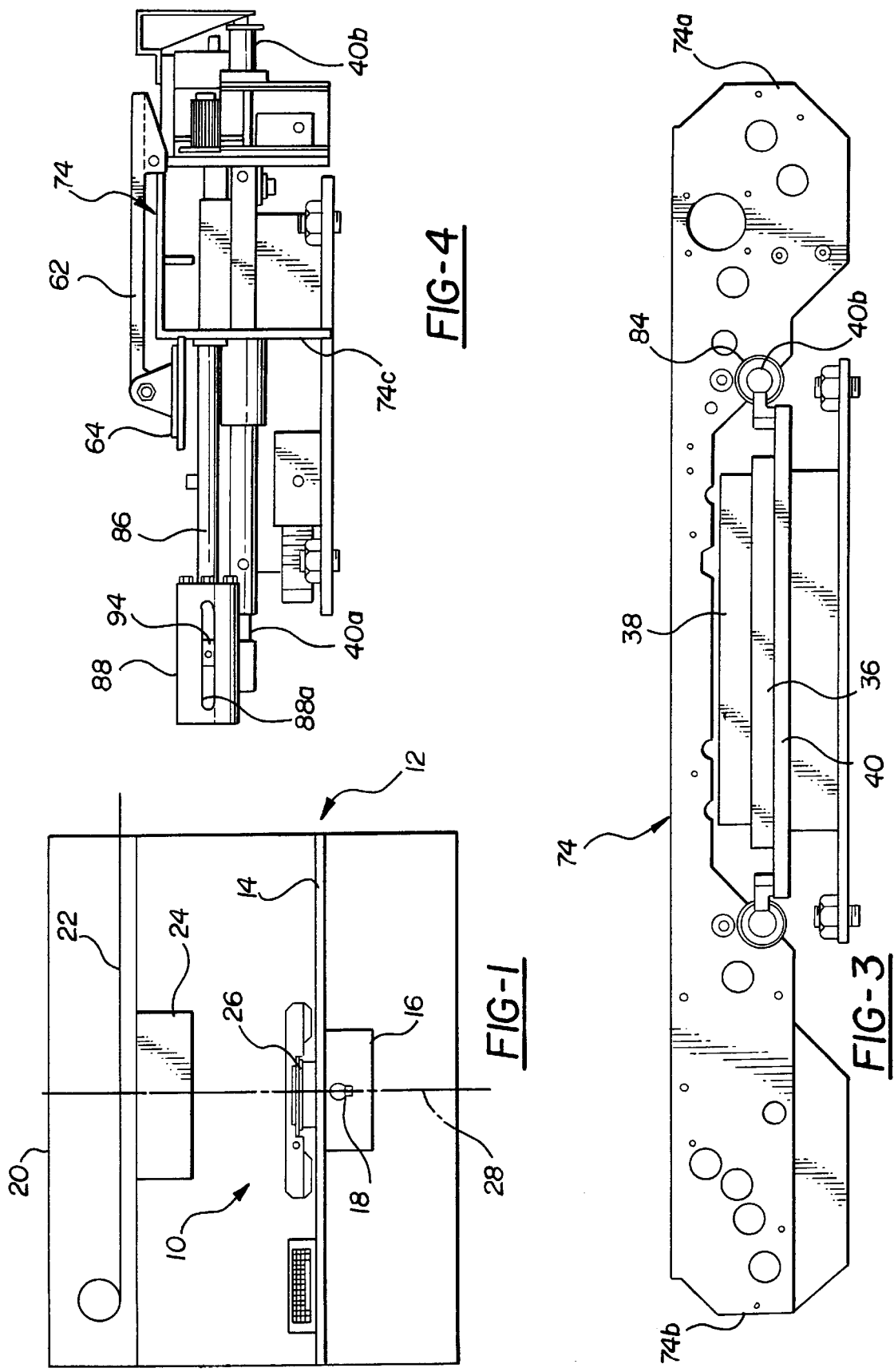

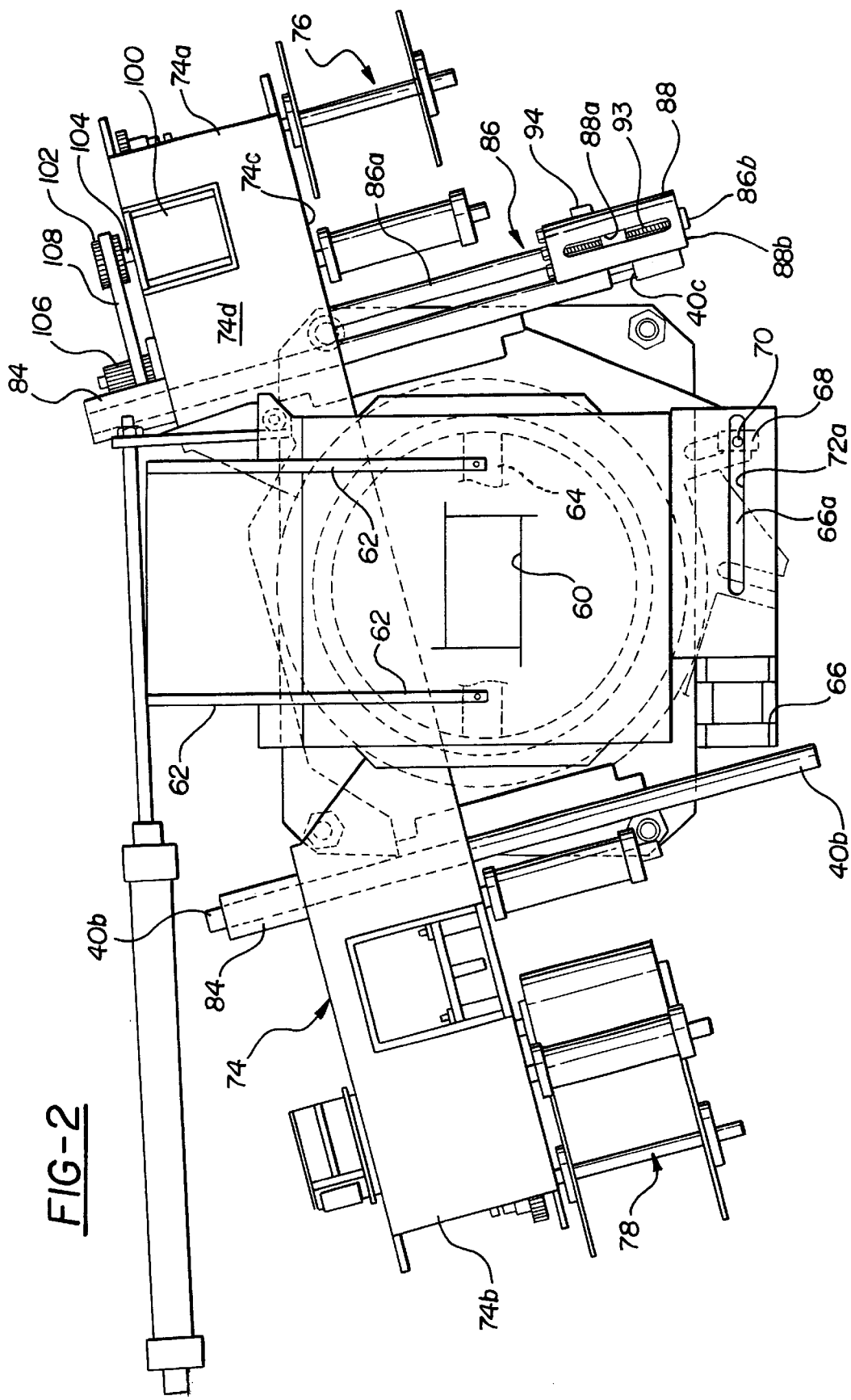

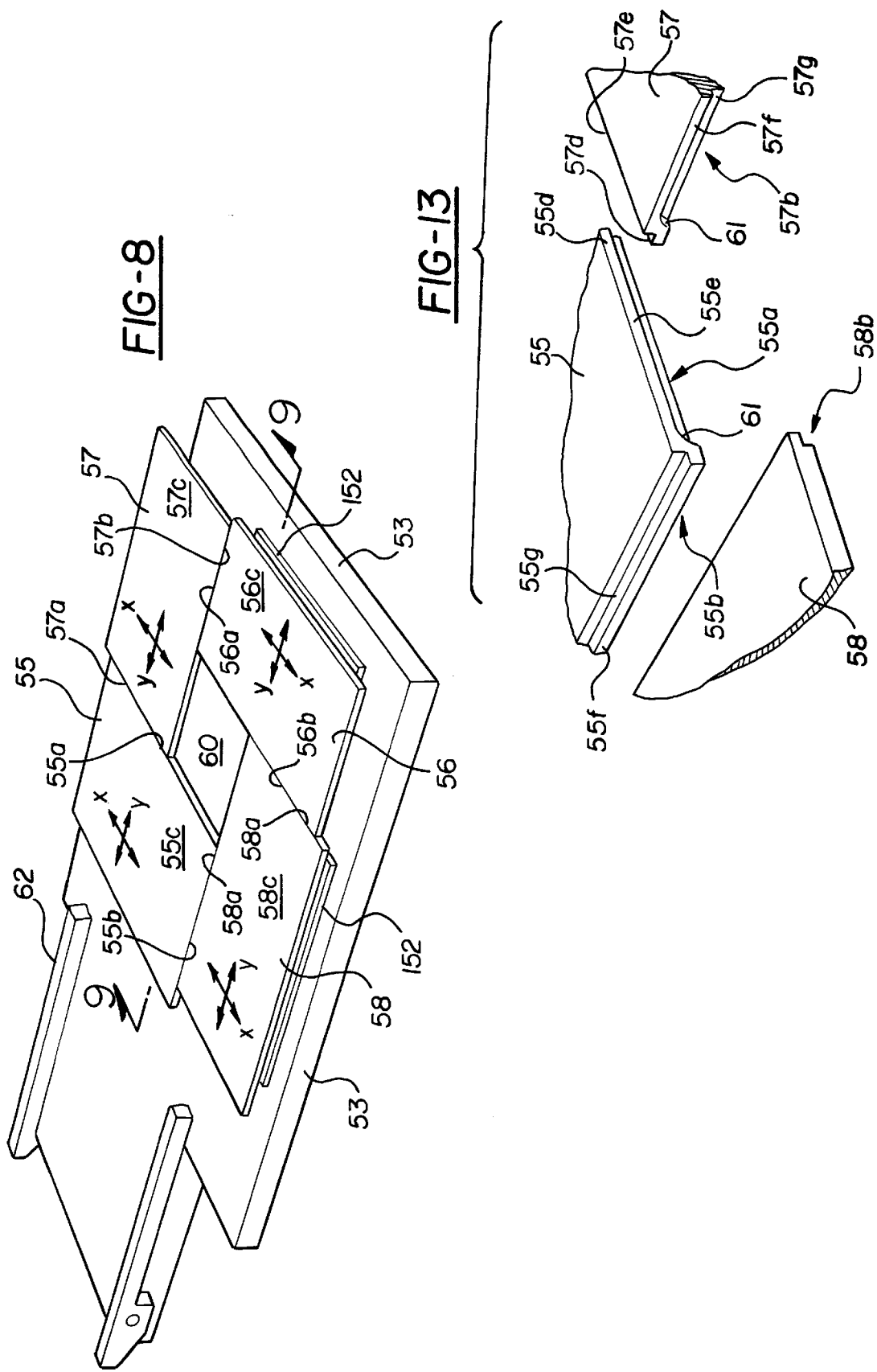

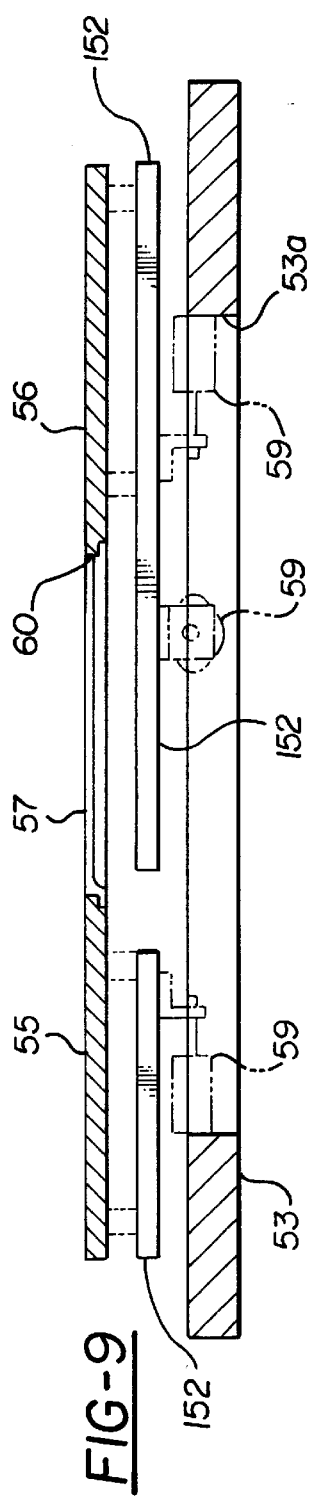
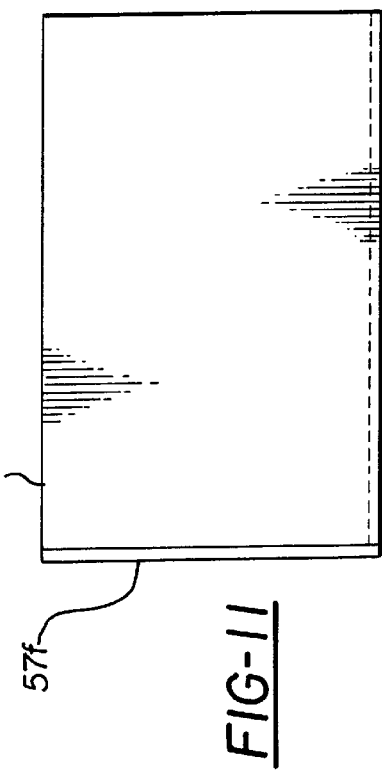
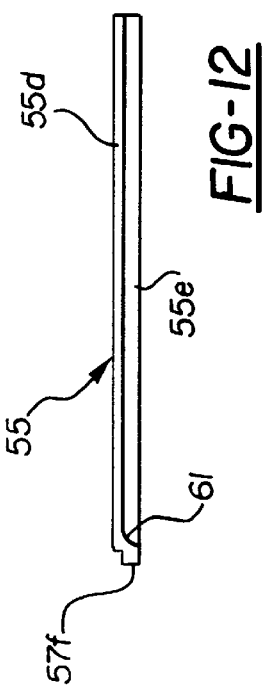
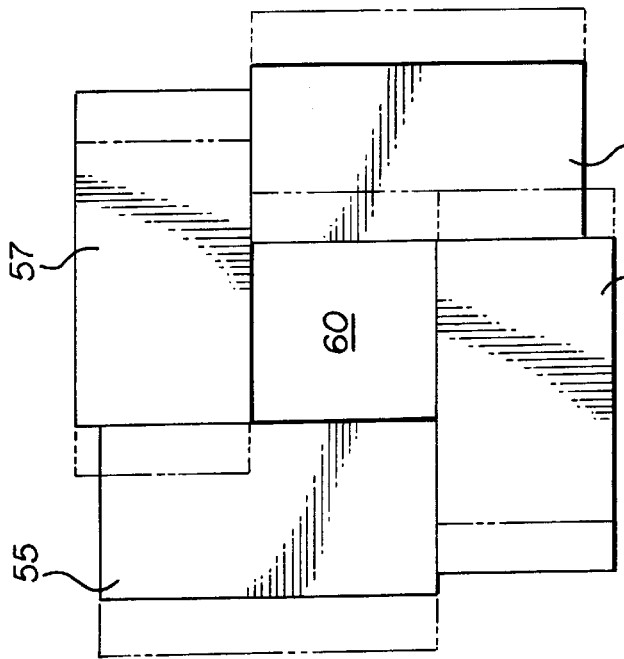

PHOTOGRAPHIC PRINTER

BACKGROUND OF THE INVENTION

This invention relates to photographic printers.

Commercial photographic processing laboratories require the capability of making vast numbers of photographic prints from equally large numbers of photographic negatives. The photographic negatives are typically handled in long roll form and are processed in photographic printers by mounting the long roll of negative film on mechanized film drives. The photographic printers may operate in both automated or semi-automated environments.

Most film drives for use with these photographic printers are either electrically or pneumatically powered. A continuous roll of exposed and developed photographic film is mounted on the feed spool of the film drive and routed across the optical stage of the photographic printer. Individual negative frames are sequentially positioned at the optical stage of the photographic printer by operation of the drive components of the film drive so that one or more photographic prints can be made from each frame under either operator or machine control. Finally, the film is collected on a film take-up spool of the film drive.

Because photographic film is manufactured in a variety of different widths, a film drive needs to be capable of variably laterally positioning the film in relation to the photographic printer so that the longitudinal center line of the various widths of photographic film can be positioned to correspond with the optical center of the photographic printer. And because each frame of a roll of photographic film requires individual cropping, a film drive further must be capable of variably positioning each frame of a roll of film of a given width in a longitudinal sense. The film drive also desirably provides the ability to expose the individual film frames in either a landscape format or a portrait format.

Various film drives are available that satisfactorily perform all of the above-described a functions. See, for example, the printers disclosed in applicant's U.S. Pat. Nos. 5,343,272, 5,146,266 and 5,097,292.

However, there still exists a need to adjust the film as it is being processed in a manner to compensate for exposures that are unwantedly tilted with respect to horizontal or vertical references; there is a need to provide an improved lens deck assembly for the printer; and there is a need to provide an improved riser block for the printer.

SUMMARY OF THE INVENTION

This invention is directed to the provision of an improved photographic printer.

More specifically, this invention is directed to the provision of a film drive assembly that provides selective positioning of each frame of film relative to the optical stage of the associated printer including positioning in a manner to compensate for unwanted tilting of the exposure.

This invention is further directed to the provision of an improved lens deck assembly for the printer.

This invention is yet further directed to the provision of an improved riser block for the printer.

The invention film drive assembly is intended for use with photographic equipment of the type including an optical stage defining an optical center line and includes a base defining a central aperture adapted to be positioned proximate the optical stage, a table assembly mounted on the base for rotary movement about the optical center line and including an aperture, and a film transport mechanism movable with the table assembly and defining a longitudinal film path passing over the table aperture whereby the film transport mechanism may be rotated with the table assembly about the optical center line between portrait and landscape formats.

According to the invention, the film drive assembly further includes rotation means mounting the film transport mechanism for rotary movement relative to the table assembly about the optical center line. With this arrangement, the film transport mechanism may be rotated relative to the table assembly aperture to rotate the film relative to the table assembly aperture and compensate for unwanted tilting of the exposure.

According to a further feature of the invention, the rotation means comprises a ring mount member having a central ring portion positioned concentric to the optical center line and parallel rails at opposite sides of the central ring portion, and the film transport mechanism is mounted on the rails for movement in a direction transverse to the longitudinal film path. With this arrangement, adjustment of the film relative to the aperture in an X direction may be achieved by selectively moving the film along the longitudinal film path, adjustment in the Y direction may be achieved by moving the film transport mechanism transversely on the rails, and rotary adjustment of the film relative to the aperture may be achieved by rotary movement of the film transport mechanism about the optical center line.

According to a further feature of the invention, first rotation means mount the ring mount member and the table assembly for joint rotary movement about the optical center line to allow joint movement of the film transport mechanism and the table assembly between portrait and landscape formats, and second rotation means mount the ring mount member for rotary movement relative to the table assembly about the optical center line to allow rotation of the film relative to the table assembly aperture.

According to a further feature of the invention, the first rotation means comprises first bearing means mounting the table assembly for rotary movement on the base and means drivingly interconnecting the table assembly and the ring mount member, the second rotation means comprises second bearing means mounting the ring mount member for rotary movement relative to the table assembly, and the means drivingly interconnecting the table assembly and the ring mount member is operative when actuated to rotate the ring mount member relative to the table assembly. This arrangement facilitates the joint rotary movement of the table assembly and ring mount member between portrait and landscape formats and further facilitates the selective rotary movement of the film relative to the table assembly aperture to correct for out of level exposures.

According to a further feature of the invention, the printer includes means for adjusting the size and configuration of the aperture and the adjusting means comprises a plurality of plates mounted for relative movement to adjustably define the aperture and having co-planar upper faces. This arrangement provides a co-planar upper face for the aperture to minimize light leakage and improve focus.

According to a further feature of the invention, the printer includes a lens deck and the lens deck includes a plurality of lens carriages mounted at respective levels on the optical axis for linear movement in parallel directions generally normal to the optical axis and each including a plurality of laterally spaced lens assemblies. With this arrangement, the carriages may be selectively moved within the lens deck housing to bring a lens or lens set into alignment with the optical axis corresponding to the film size in use and the desired print sizes.

BRIEF DESCRIPTION OF THE DRAWINGS

FIG. 1 is schematic view of a photographic printer employing a film drive assembly according to the invention;

FIG. 2 is a plan view of the film drive assembly;

FIG. 3 is a front view of the film drive assembly;

FIG. 4 is an end view of the film drive assembly;

FIG. 8 is a perspective view of a riser block employed in the printer;

FIG. 9 is a cross-sectional view taken on line 9—9 of FIG. 8;

FIG. 10 is a schematic plan view of the riser block;

FIG. 11 is a plan view of a blade employed in the riser block;

FIG. 12 is an edge view of the blade of FIG. 11;

FIG. 13 is a fragmentary exploded view of coacting blades employed in the riser block;

DETAILED DESCRIPTION OF THE PREFERRED EMBODIMENT

Figure 5:
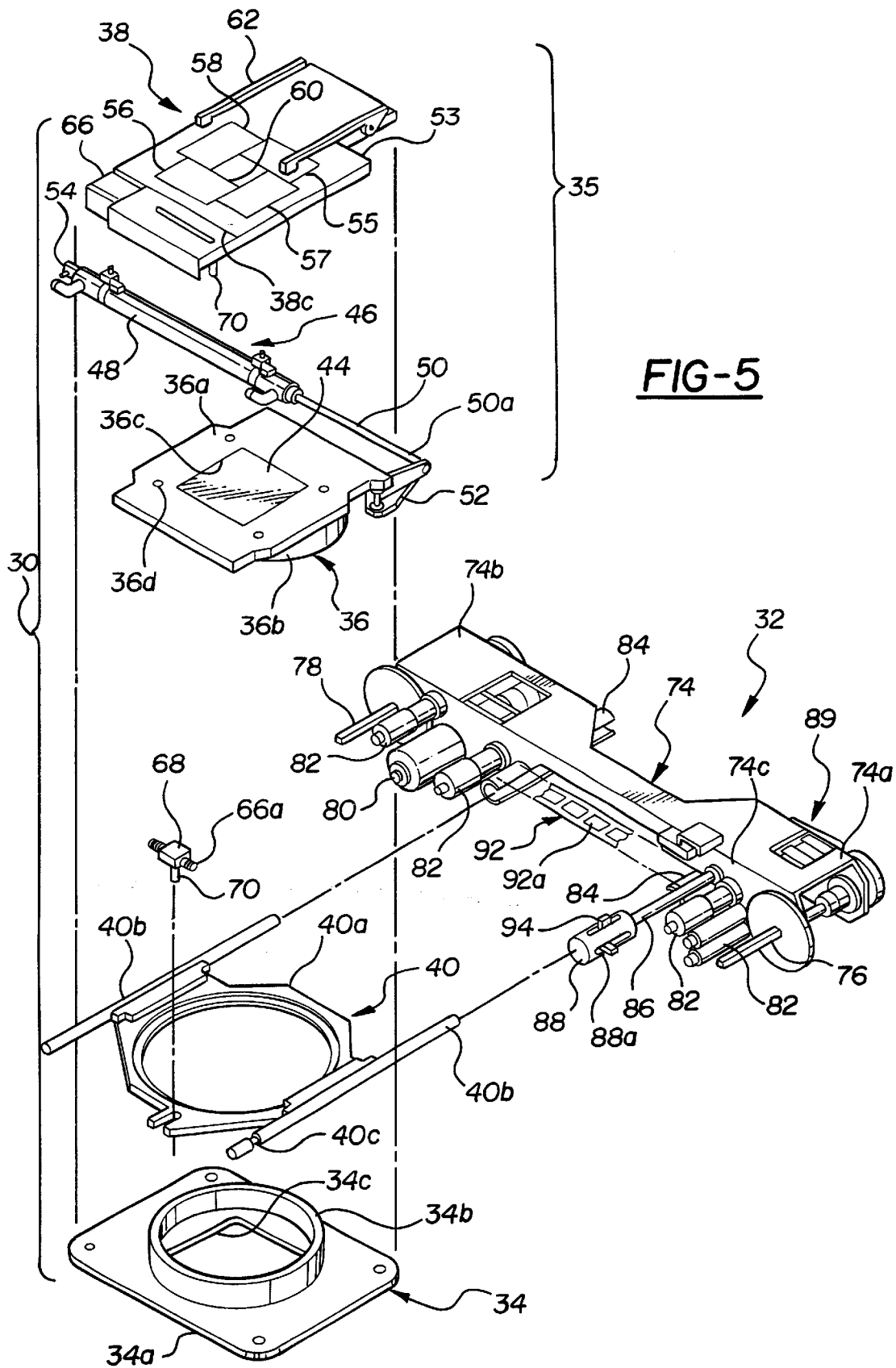
FIG. 5 is an exploded view of the film drive assembly.
Figure 6:
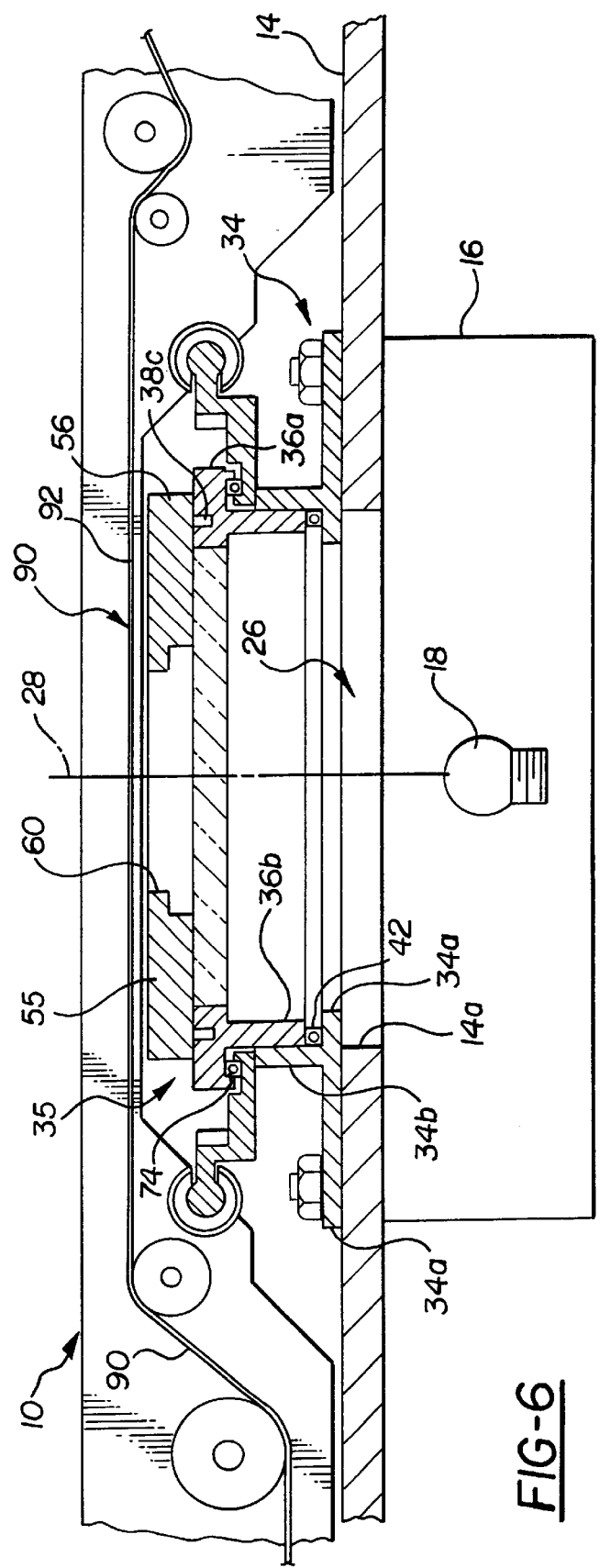
FIG. 6 is a somewhat schematic cross-sectional view of the film drive assembly.

The photographic printer of the invention is seen generally in FIG. 1 at 12.

Photographic printer 12 has a desk configuration and includes a work surface or counter 14 supporting a film drive assembly 10, a lamp house 16 positioned beneath the counter and including a light source 18, a paper drive cabinet 20 positioned over the counter and housing a supply of photographic paper 22, and a lens deck assembly 24 positioned beneath cabinet 20 and over film drive assembly 10.

Film drive assembly 10 is positioned on surface 14 at the optical stage 26 of the photographic printer in symmetric relation to the optical center line or axis 28 of the photographic printer.

With reference to FIGS. 2–6, film drive assembly 10, broadly considered, includes a mount base assembly 30 and a film transport mechanism 32.

Mount base assembly 30 includes a base 34, a table assembly 35, and a ring mount member 40.

Base 34 includes a generally planar base portion 34a and a central annular pedestal portion 34b upstanding from plate portion 34a. Base portion 34 is fixedly secured to surface 14 in symmetric relation to center line 28 and defines a central aperture 34c positioned over an aperture 14a in surface 14 so as to allow light from light source 18 to pass upwardly through apertures 14a and 34c.

Table assembly 35 includes a table 36 and a riser block 38.

Table 36 includes a planar main body portion 36a and a downstanding annular ring portion 36b. Ring portion 36b is rotationally received within pedestal portion 34b of the base utilizing bearing means 42. A central aperture 36c is provided in planar portion 34a and a glass or plexiglass light-diffusing member 44 is positioned in aperture 36c. An air cylinder 46 controls rotary movement of table 36 about center line 28 between landscape and portrait positions. Air cylinder 46 includes a cylinder body 48, a piston rod 50, and a bracket 52 interconnecting the free end 50a of the piston rod to table 36. A bracket 54 on cylinder 48 allows the cylinder 46 to be fixedly secured to a suitable location on the photographic printer 12.

Riser block 38 includes a planar base member 53 having a central aperture 53a, four selectively movable identical cropping blades 55, 56, 57 and 58 positioned on base member 53 and defining an aperture 60 in overlying relation to aperture 53a, and a plurality of stepper motors 59 positioned on the base member 53 and operative to selectively and individually move blades 55–58 to selectively vary the size and configuration of aperture 60.

Figure 14:
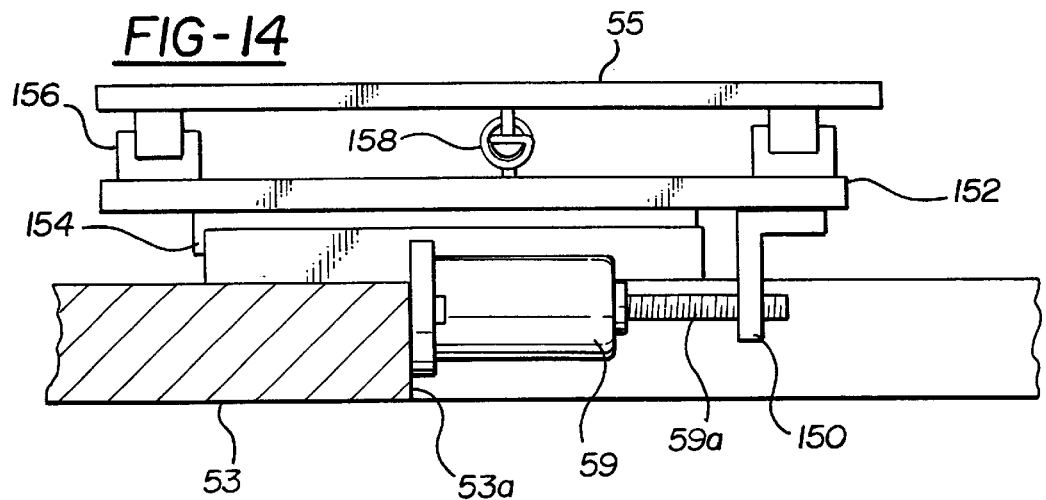
FIGS. 14 and 15 are detail views showing the mounting and powering of a blade.
Figure 15:
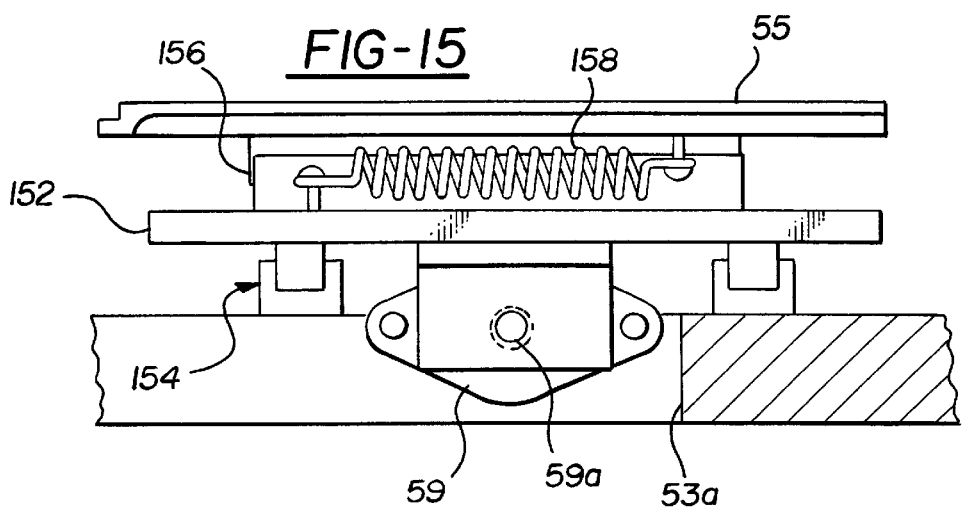

Each blade is mounted for movement on base 53 in both X and Y directions and is powered for movement in either the X or Y direction by a respective stepper motor 59. For each plate, the stepper motor is positioned beneath the plate in base aperture 53a and includes a lead screw 59a threadably engaging a threaded bore in a bracket 150 fixed to the underface of a mounting plate 152 which is mounted for movement on base 53 in a Y direction by bearing ways 154. The respective plate (55 in FIG. 14) is in turn mounted on the mounting plate 152 by bearing ways 156 mounting the plate 55 for movement on the mounting plate in an X direction.

Plates 55, 56, 57 and 58 are arranged for relative sliding movement to vary the size and configuration of central aperture 60. The sliding interfaces between the plates define a generally tongue and groove configuration.

Specifically, edge 55a of plate 55 defines a tongue (55d) and groove (55e) configuration for mating sliding coaction with a reverse tongue (57d) and groove (57e) configuration defined by edge 57a of plate 57; edge 57b of plate 57 has a tongue (57f) and groove (57g) configuration for mating sliding coaction with a reverse tongue and groove configuration defined by edge 56a of plate 56; edge 56b of plate 56 has a tongue and groove configuration slidably coacting with a reverse mating tongue and groove configuration on edge 58a of plate 58; and edge 58b of plate 58 has a tongue and groove configuration slidably coacting with a reverse tongue (55f) and groove (55g) configuration in edge 55b of plate 55.

The mating tongue and groove configurations at the sliding interfaces of the plates allows the top surfaces 55c, 56c and 57c and 58c of the plates to lie in a common plane whereby to present a perfectly flat surface for receipt of the underface of a film strip 92 positioned thereover so that all edges of the film strip and all edges of the aperture are in a common plane to provide a uniform depth of focus on all four sides of the aperture to facilitate sharp focusing of the desired image along all four edges. The described tongue and groove arrangement also provides square corners for the aperture 60 with co-planar upper and lower surfaces, in contrast to the corner fillets present in machined apertures and in contrast to the light transmitting overlapping corners present when overlapping plates are used to form the aperture. Light transmission at the corners of the aperture is further diminished by the machining of the tongue and groove edge of the plates whereby the groove (for example, 55e or 57g) extending along an edge of the plate terminates in a fillet or a land portion 61 at the corner of the plate.

Plates 55 and 56 may, for example, be powered by their respective stepper motors 59 to move in a Y direction and may be free to move in an X direction under the urging of plate 57 and 58, and plates 57 and 58 may be powered by their respective stepper motors 59 to move in an X direction and may be free to move in a Y direction under urging of the plates 55 and 56. A spring 158 extends between each blade and the underlying mounting plate in a direction parallel to bearing ways 156. Springs 158 yieldably resist movement of the plate in response to powered movement of an adjacent plate, whereby to maintain a firm driving abutment at the interface of the powered plate and the moved plate and whereby to maintain a positive load on the lead screw of the associated stepper motor to preclude slop or lost motion in the plate drive system.

The riser block further includes lever arms 62 pivotally mounted on base member 53 to control a clamp 64 for holding a film frame positioned over aperture 60 in a flat disposition on the flat co-planar surface defined by the cropping plates 55–58. Arm 62 and thereby clamp 64 may be controlled in known manner by air cylinders carried by base member 53. A stepper motor 66 is secured to the front face 53a of the base member and includes a screw output shaft 66a threadably engaging a nut 68 carrying a pin 70 slidably guiding in a slot 72a of a guide plate 72 whereby actuation of stepper motor 66 rotates screw shaft 66a to move nut 68 and pin 70 linearly along slot 72a. Riser block 38 is positioned on top of table 36a and is held in position relative to table 36a via pins 38c received in corresponding holes 36d in table 36.

Ring mount member 40 includes a central ring portion 40a and parallel rail portions 40b positioned on opposite, diametrically opposed sides of ring portion 40a. Ring portion 40a is rotationally mounted beneath table main body portion 36a in surrounding relation to table ring portion 36b utilizing a bearing structure 74. A radially outwardly opening slot 40c in ring 40a receives the lower end of pin 70 so that the pin functions to move the ring mount member jointly with the table assembly between portrait and landscape formats but linear movement of pin 70 in guide slot 72a in response to actuation of stepper motor 66 has the effect of rotating ring mount member 40 relative to riser block 38 about optical center line 28. Initial and moved positions of ring mount member 40 relative to the riser block are shown in solid and dash lines respectively in FIG. 2. It will be seen that pin 70 moves radially in slot 40c as the ring mount member rotates relative to riser block 38.

Film transport mechanism 32 includes an elongated frame 74, a supply or feed spool 76 mounted on a feed end 74a of the frame, a take-up spool 78 mounted on a delivery end 74b of the frame, a suitably powered drive spool 80, guide spools 82, C-tubes 84, a selector shaft 86, a selector or index knob 88, and a vernier adjustment assembly 89. Film transport 32 is mounted on the ring mount member 40 by positioning C-tubes 84 slidably over respective rails 40b so that the film transport is free to move laterally or transversely with respect to the ring mount member. Spools 76–82 coact to define a longitudinal film feed path 90 extending from supply spool 76 to take-up spool 78 and passing over riser block aperture 38a proximate optical center line 28 so that film 91 from supply spool 76 may be selectively and incrementally moved along path 90 for take-up on spool 78 and individual film frames 92a (FIG. 7) may be incrementally and respectively moved into alignment with optical center line 28.

Selector shaft 86 has a circular cross-section and passes slidably through a journal aperture provided in the front wall 74c of frame 74 with a portion 86a extending in cantilever fashion from the front wall and terminating in a free end 86b.

Selector or index knob 88 has a generally circular configuration and is mounted for rotation on the cantilever portion 86a of selector shaft 86 proximate the free end 86b. Selector knob 88 is provided with four slots 88a extending parallel to the axis of shaft 86 and spaced equally circumferentially about the knob. A corresponding plurality of threaded shafts 93 have a slotted end positioned proximate the outboard face 88b of the selector knob to allow for manual rotation of the shafts. Tabs 94 are threadably mounted on respective threaded shafts 93 and extend radially outwardly through respective slots 88a. The tabs 93 are moved laterally along the central axis of selector shaft 86 by selective rotation of threaded shafts 90 utilizing the slotted shaft ends.

Vernier assembly 89 includes an electric stepper motor 100 mounted in the top wall 74b of the frame, a drive pulley 102 driven by a stepper motor output shaft 104, a driven pulley 106, and a drive belt 108 trained around pulleys 102 and 106 so that pulley 106 is rotated in response to energization of stepper motor 100. Pulley 106 includes a threaded internal bore (not shown) threadably receiving a threaded inboard end of selector shaft 86. Further details of selector assembly 86/88 and vernier adjustment assembly 89 are shown in assignee's U.S. Pat. No. 5,343,272.

Film transport mechanism 32 will be seen to be mounted on rails 40b for sliding movement relative to the ring mount member to selectively laterally position a frame 92a of the film 92 relative to aperture 38a in riser block 38. Specifically, tabs 94 of selector knob 88 are preset by selective adjustment of the associated shafts 93 to respectively correspond to a plurality of commonly encountered film width sizes such, for example, as 35 mm, 70 mm, etc.

Lens deck assembly 24 includes a housing or cabinet 110 and a plurality of lens carriages 112, 114, 116 positioned in the cabinet 110.

Cabinet 110 is positioned beneath photographic paper drive cabinet 20 in overlying relation to film drive assembly 10 and is centered on optical axis 28.

Figure 16:
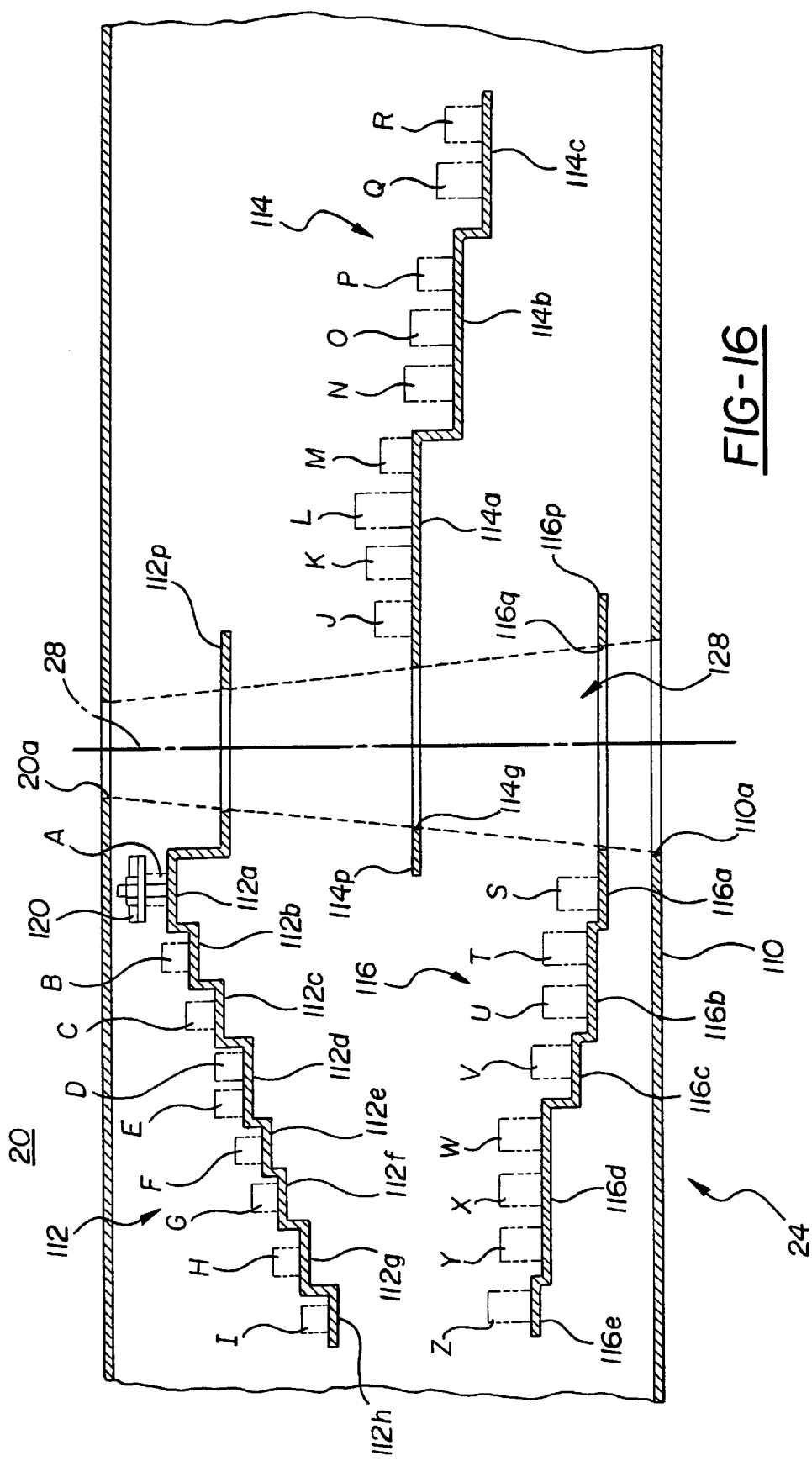
FIG. 16 is a somewhat schematic view of a lens deck employed in the printer.

Lens carriages 112, 114 and 116 (FIG. 16) are mounted in the cabinet for sliding movement in generally horizontal directions generally perpendicular to optical axis 28 and are positioned at different levels in the cabinet. Specifically, lens carriage 112 is mounted at an upper level in the cabinet and has a rest or park position to the left of optical axis 28 as viewed in FIG. 16; lens carriage 114 is mounted at an intermediate level in the cabinet below carriage 112 and has a rest or park position to the right of optical axis 28; and lens carriage 116 is mounted at a lower level in the cabinet below carriage 114 and has a rest or park position to the left of optical axis 28.

Each carriage 112, 114, 116 has a stepped configuration defining a plurality of successively and incrementally increasing or decreasing levels. Specifically, carriage 112 defines successively lower levels 112a, 112b, 112c, 112d, 112e, 112f, 112g and 112h; carriage 114 defines successively lower levels 114a, 114b and 114c; and carriage 116 defines successively higher levels 116a, 116b, 116c, 116d and 116e.

A lens or lens set is positioned on each level of each carriage. Each lens or lens set corresponds to a film size and to a desired print size. Specifically, four lenses A corresponding to wallet sized 6 mm×6 mm film may be positioned on level 112a; four lenses B corresponding to wallet sized 6 mm by 4.5 mm film may be positioned on level 112b; Four lenses C corresponding to wallet sized 46 mm film may be positioned on level 112c; two lenses D corresponding to 3.5×5 prints of 6 mm×4.5 mm film may be positioned on level 112d; four lenses E corresponding to wallet sized non-perforated 35 mm film may also be positioned on level 112d; two lenses F corresponding to 3.5×5 prints of 6 mm×4.5 mm film may be positioned on level 112e; four lenses G corresponding to wallet sized prints of perforated 35 mm film may be positioned on level 112f; two lenses H corresponding to 3.5×5 prints of 46 mm film may be positioned on level 112g; two lenses I corresponding to 5×7 prints of 6 mm×6 mm film may be positioned on level 112h; two lenses J corresponding to 3.5×5 prints of 35 mm perforated film may be positioned on level 114a; two lenses K corresponding to 5×7 prints of 6 mm×4.5 mm film may be positioned on level 114a outboard of lenses J; two lenses L corresponding to 3.5×5 prints of non-perforated 35 mm film may be positioned on level 114a inboard of lenses K; two lenses M corresponding to 5×7 prints of 46 mm film may be positioned on level 114a outboard of lenses L; two lenses N corresponding to 4×5 prints of 35 mm perforated film may be positioned on lens level 114b; one lens O corresponding to an 8×10 print of 6 mm×6 mm film may be positioned on level 114b outboard of lenses N; two lenses P corresponding to a 5×7 print of 35 mm non-perforated film may be positioned on lens level 114b outboard of lenses O; one lens Q corresponding to an 8×10 print of 6 mm×4.5 mm film may be positioned on lens level 114c; two lenses R corresponding to 5×7 prints of 35 mm perforated film may be positioned on lens level 114c outboard of lenses Q; one lens S corresponding to either an 11×14 or a 10×13 print of 35 mm perforated film may be positioned on lens level 116a; one lens T corresponding to an 8×10 print of 35 mm perforated film may be positioned on lens level 116b; one lens U corresponding to either an 11×14 or a 10×13 print of 35 mm non-perforated film may be positioned on lens level 116b outboard of lens T; one lens V corresponding to either an 11×14 or a 10×13 print of 46 mm film may be positioned on lens level 116c; one lens W corresponding to an 8×10 print of 35 mm non-perforated film may be positioned on lens level 116d; one lens X corresponding to either and 11×14 or a 10×13 print of 6 mm×4.5 mm film may be positioned on lens level 116d outboard of lenses W; one lens Y corresponding to either an 11×14 or a 10×13 print of 6 mm×6 mm film may be positioned on lens level 116d outboard of lenses X; and one lens Z corresponding to an 8×10 print of 46 mm film may be positioned on lens level 116e.

Figure 18:
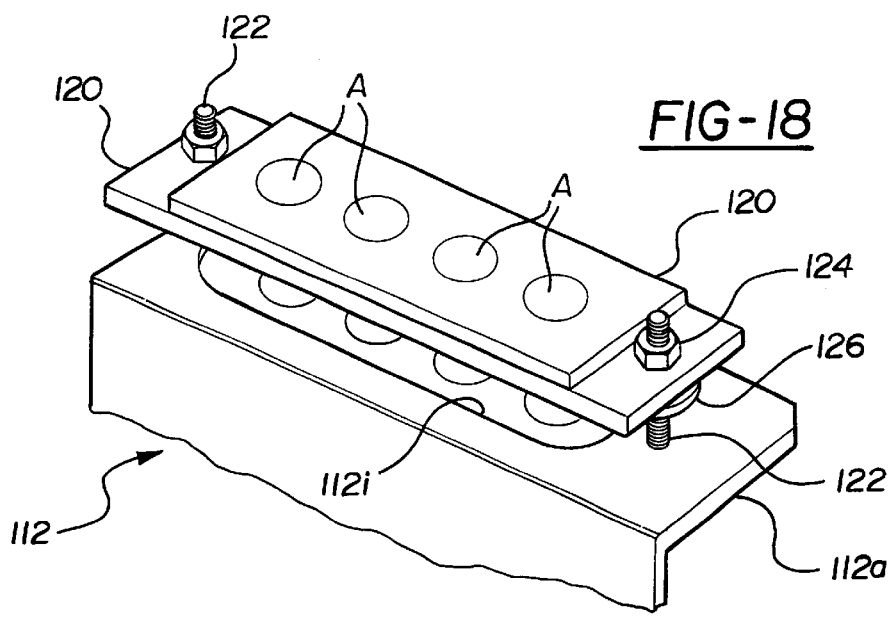
FIG. 18 is a detail view of a portion of the carriage of FIG. 17.

Each lens or set of lenses is mounted on the respective carriage level by the lens mounting structure best seen in FIG. 18 which illustrates the mounting of the four lenses A on the level 112a of carriage 112.

Specifically, each lens or lens set is mounted on a lens board 120 and the lens board is mounted on a pair of threaded studs 122 upstanding from opposite sides of the respective level. The lenses A are positioned at their upper ends in board 120 and are positioned at their lower ends in an opening 112i in the level 112a of carriage 112. The precise height of the board 120 above level 112a, and thereby the precise level of lenses A relative to the optical axis 28, is adjusted by selective manipulation of a nut 124 and a knurled knob 126 associated with each stud. It will be understood that an adjustable lens board assembly as seen in FIG. 18 is provided in association with each lens or lens set so that the height of each lens or lens set may be individually adjusted relative to the optical axis, and it will be seen that different lens sets positioned on the same level of the same carriage may be arranged at varying increasing or decreasing heights relative to the optical axis.

It will be understood that, in the operation of the printer, the desired lens set providing the exposure magnification corresponding to the film size being processed and the print sizes desired, is moved into alignment with optical axis 28 by selective sliding movement of the appropriate carriage in the lens deck housing. In this regard, lenses on carriages 112 and 116 are selected in response to rightward movement of the carriages from their parked positions of FIG. 16 and lenses on carriage 114 are selected in response to leftward movement of the carriage from its parked position of FIG. 16.

Each carriage further includes an inboard baffle portion 112p, 114p, 116p, respectively defining rectangular baffle apertures 112q, 114q and 116q. Aperture 116q is larger than aperture 114q and aperture 114q is larger than aperture 112q so that the apertures, when all of the carriages are parked, define a pyramidal light column 128 which is further defined by a relatively large aperture 110a in the base of the lens deck cabinet centered on optical axis 28 and a relatively small aperture 20a in the lower face of the paper cabinet centered on optical axis 28.

When a lens is selected from carriage 112, baffle apertures 114q and 116q coact to form a natural baffling system to eliminate reflection problems caused by stray light that does not follow the intended optical path but rather reflects onto adjacent surfaces and onto the photographic paper. A similar baffling action is provided by baffle apertures 116q and 112q when a lens set on carriage 114 is in use and by baffle apertures 112q and 114q when a lens set on carriage 116 is in use.

Figure 17:
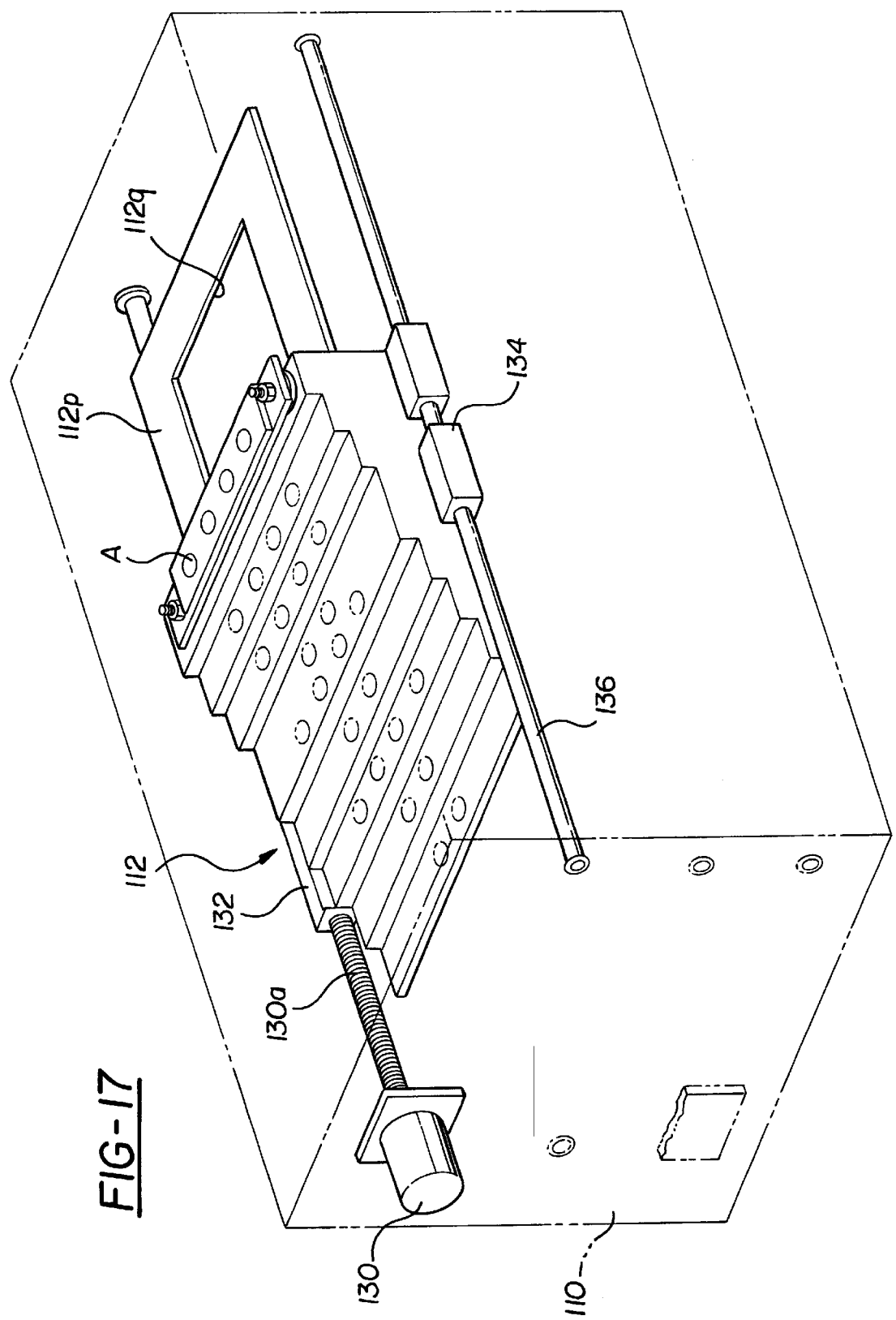
FIG. 17 is a perspective view of a carriage employed in the lens deck.

The mounting and movement of the carriages in the lens cabinet is seen in FIG. 17 where carriage 112 is illustrated in a position in which it has been moved to the right to position one of the lens sets in alignment with optical axis 28. As seen, movement of the carriage in the lens deck cabinet is achieved by a stepper motor 130 mounted on the cabinet and including a lead screw 130a threadably coacting with a nut structure 132 carried by the carriage to move the carriage fore and aft within the cabinet with the carriage movement guided by bearing blocks 134 on the carriage guiding on a guide rod 136. Carriages 114 and 116 (not shown in FIG. 17) are similarly mounted, similarly moved, and similarly guided.

When processing a roll of film corresponding to a given film width, the operator simply moves the film drive assembly laterally on rails 40b to a position corresponding to the particular film width being processed and then rotates the selector knob 88 to position the tab 94 corresponding to the specific film width being processed in the detent 40c of the adjacent rail 40b to lock the film drive assembly relative to the mount base assembly. This gross adjustment of the film drive assembly relative to the mount base assembly prepares the mechanism for processing the roll of film having the width corresponding to the setting of the coacting interengaging tab 94 and detent 40c.

As each frame 92a of the film is positioned over the aperture 60 of the riser block, stepper motor 100 is selectively energized to provide a fine, lateral adjustment of the film relative to the aperture 60 corresponding to the specific cropping desired for that frame. The energization of the motor 100 and thereby the fine adjustment of the lateral position of the film drive assembly for each frame may be accomplished by a control panel under the control of the operator or may be accomplished by utilizing information stored in a database for each frame. Each frame of film may thus be selectively positioned relative to the aperture and relative to the optical center line along the Y axis, that is, the axis transverse to the path of movement of the film. Information stored in the database for each frame may also be utilized to selectively position each frame in the X direction relative to the aperture in the riser block, that is, the direction in which the film is moving; further stored information for each frame may be utilized to selectively actuate stepper motors 59 to selectively and individually adjust blades 55–58 and thereby selectively adjust the cropping for each frame; further stored information for each frame may be utilized to move the table assembly and film drive jointly between portrait and landscape formats; and further stored information for each frame may be utilized to selectively actuate stepper motors 130 to selectively move carriages 112, 114, and 116 to selectively bring the lens set corresponding to the film size in use and the desired print sizes into alignment with the optical axis.

Also, according to the invention, further information may be stored in the database for each frame with respect to any undesired tilting of the exposure of the frame caused, for example, by a camera that is not held in a level position at the time that the exposure is made. This tilt database information may be utilized according to the invention to selectively energize stepper motor 66 to selectively move pin 70 along slot 72a to selectively rotate the ring mount member and thereby the film transport mechanism relative to the riser block about the optical center line 28 (for example as between the solid line position of FIG. 2 and the dash line position of FIG. 2) to move the frame of film rotationally relative to the riser block aperture to correct for undesired tilting of the exposure of the frame.

Figure 7:
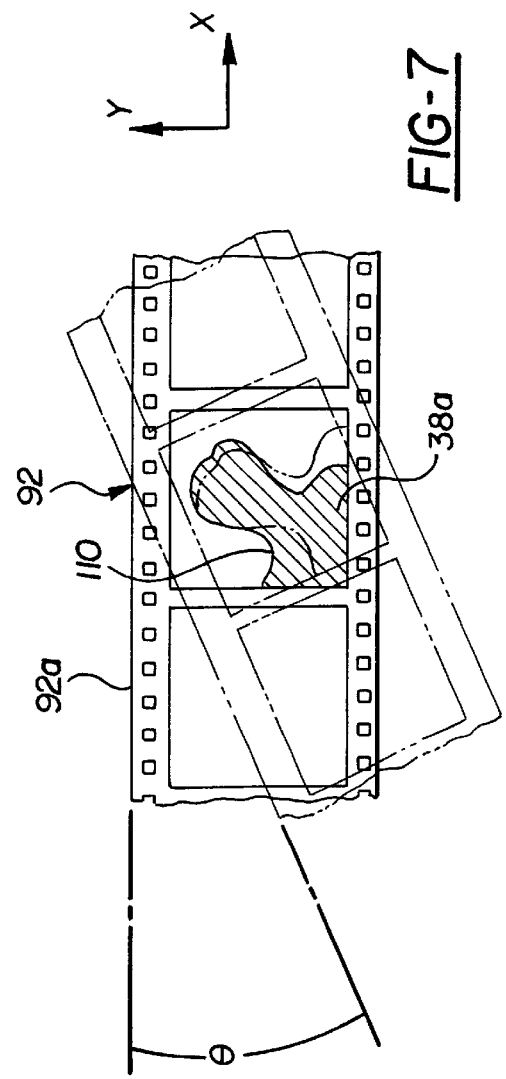
FIG. 7 is a schematic view showing film movements achieved utilizing the invention film drive assembly.

This rotational movement of the frame 92a about the optical center line 28 relative to the riser block aperture 60 is best seen in FIG. 7 wherein an initial tilted disposition of an image 110 in a frame 92a relative to riser block aperture 60 resulting from the camera not being level is shown in solid lines and the corrected or level disposition of the image relative to the riser block aperture 60 resulting from selective rotational movement of the ring mount member through an angle θ is seen in dash lines.

The invention will be seen to provide a photographic printer which allows for automated production of photographs without operator intervention. Specifically, the invention provides automated X and Y adjustment of each frame relative to the riser block aperture; automated rotation of the frame relative to the riser block aperture to correct for tilted images; automated selection of the size and configuration of the riser block aperture; and automated selection of the lens to accomplish the exposure magnification selection corresponding to the film in use and the desired print size.

Whereas a preferred embodiment of the invention has been illustrated and described in detail, it will be apparent that various changes may be made in the disclosed embodiment without departing from the scope or spirit of the invention.

What is claimed is:

1. A photographic printer including a lamp, a film transport positioned over the lamp and coacting with the lamp to define an optical axis, a photographic paper drive positioned over the film transport and a lens deck positioned between the film transport and the photographic paper drive, characterized in that the lens deck includes a plurality of lens carriages mounted at respective levels on the optical axis for translatory movement in parallel directions generally normal to the optical axis and each including a plurality of laterally spaced lens assemblies movable in response to the translatory movement of the respective lens carriage successively into alignment with the optical axis.

2. A photographic printer according to claim 1 wherein the laterally spaced lens assemblies on each carriage are positioned at different levels with respect to the optical axis so that translatory movement of a lens carriage moves successive lens assemblies on the carriage into alignment with the optical axis at successively varying levels with respect to the optical axis.

3. A photographic printer according to claim 2 wherein:
each carriage has an inboard end proximate the optical axis and an outboard end remote from the optical axis; and
each carriage is moveable linearly to a park position where its most inboard lens assembly is positioned outboard of the optical axis whereby to position the lens assemblies clear of the optical axis.

4. A photographic printer according to claim 3 wherein:
the inboard end of each carriage defines a baffle defining a baffle aperture; and
each baffle aperture is aligned with the optical axis with the respective carriage in its park position.

5. A photographic printer according to claim 4 wherein the baffle aperture defined by each successively higher carriage is progressively smaller so that with all of the carriages in their park position the baffle apertures of the parked carriages align with the optical axis and align with each other to define a light column of progressively diminishing diameter measured upwardly.

6. A photographic printer according to claim 5 wherein each baffle aperture has a rectangular configuration so that the light column has a pyramidal configuration.

7. A photographic printer according to claim 3 wherein each carriage has a stepped configuration to define a plurality of progressively varying levels moving inboard to outboard and at least one lens assembly is positioned on each step level of each carriage.

8. A photographic printer according to claim 3 wherein at least one carriage has a park position on a left side of the optical axis and at least one carriage has a park position on a right side of the optical axis.

9. A photographic printer according to claim 8 wherein successive carriages at successively higher levels alternate with respect to the left or right park position.

10. A photographic printer according to claim 2 wherein:
each lens assembly has an exposure magnification corresponding to a particular film size and a particular print size;
a plurality of lens assemblies corresponding to different print sizes are provided for each film size; and
the lens assemblies for each film size are distributed on various levels of various carriages in an intermixed fashion with respect to the lens assemblies of other film sizes.

11. A photographic printer including a lamp, a film transport positioned over the lamp and coacting with the lamp to define an optical axis, a photographic paper drive positioned over the film transport, and a lens deck positioned between the film transport and the photographic paper drive, characterized in that:
the lens deck comprises at least one carriage mounted for translatory movement in a direction generally perpendicular to the optical axis and including a plurality of lens assemblies mounted on the carriage at laterally spaced locations and at various levels with respect to the optical axis; and
the carriage is movable translatory to a park position in which all of the lens assemblies are on one side of the optical axis successively toward the other side of the optical axis so as to bring successive lens assemblies into alignment with the optical axis at successive levels with respect to the optical axis.

12. A photographic printer according to claim 11 wherein there are a plurality of lens carriages mounted at respective levels on the optical axis for translatory movement in parallel directions generally normal to the optical axis and each including a plurality of laterally spaced lens assemblies at various levels with respect to the optical axis.

13. A photographic printer according to claim 12 wherein:
each carriage has an inboard end proximate the optical axis and an outboard end remote from the optical axis; and
each carriage is moveable linearly to a park position where its most inboard lens assembly is positioned outboard of the optical axis whereby to position the lens assemblies clear of the optical axis.

14. A photographic printer according to claim 13 wherein:
the inboard end of each carriage defines a baffle defining a baffle aperture; and
each baffle aperture is aligned with the optical axis with the respective carriage in its park position.

15. A photographic printer according to claim 14 wherein the baffle aperture defined by each successively higher carriage is progressively smaller so that with all of the carriages in their park positions the baffle apertures of the parked carriages align with the optical axis and align with the each other to define a light column of progressively diminishing diameter measured upwardly.

16. A photographic printer according to claim 15 wherein each baffle aperture has a rectangular configuration so that the light column has a pyramidal configuration.

17. A photographic printer according to claim 16 wherein each carriage has a stepped configuration to define a plurality of progressively varying levels moving inboard to outboard and at least one lens assembly is positioned on each step level of each carriage.

18. A photographic printer according to claim 17 wherein:
at least one carriage has a park position on a left side of the optical axis and at least one carriage has a park position on a right side of the optical axis; and
successive carriages at successively higher levels alternate with respect to the left or right park position.

19. A photographic printer according to claim 12 wherein:
each lens assembly has an exposure magnification corresponding to a particular film size and a particular print size;
a plurality of lens assemblies corresponding to different print sizes are provided for each film size; and
the lens assemblies for each film size are distributed on various levels of various carriages in an intermixed fashion with respect to the lens assemblies of other film sizes.

20. For use with a photographic printer including a lamp, a film transport positioned over the lamp and coacting with the lamp to define an optical axis, a photographic paper drive positioned over the film transport, and a lens deck positioned between the film transport and the photographic paper drive, a method of providing a lens assembly corresponding to particular film sizes and particular print sizes, the method comprising:
providing at least one lens carriage arranged for translatory movement along a linear path intersecting the optical axis in a generally perpendicular fashion;
positioning a plurality of lens assemblies on the carriage at laterally spaced locations and at various levels with respect to the optical axis; and
moving the carriage translatorily along the path to bring successive lens assemblies into alignment with the optical axis at successive levels with respect to the optical axis to provide lens assemblies corresponding to various film sizes and various print sizes.

21. A method according to claim 20 wherein:
a plurality of lens carriages are provided at varying heights with respect to the optical axis and each mounted for translatory movement along a linear path;
a plurality of lens assemblies corresponding to particular film sizes and particular print sizes are positioned on each carriage at laterally spaced locations along the carriage and at various levels with respect to the optical axis;
the various carriages are selectively moved translatory along their respective linear paths to bring a lens assembly corresponding to a particular film size and a particular print size into alignment with the optical axis.

22. A method according to claim 21 wherein the lens assemblies for various film sizes are distributed on various levels of the various carriages in an intermixed fashion with respect to the lens assemblies for other film sizes.

23. A method according to claim 21 wherein:
each carriage defines a baffle defining a baffle aperture moveable into alignment with the optical axis in response to translatory movement of the carriage along its linear path; and
the carriages not in use to provide the desired lens assembly are positioned in a park position in which their baffle apertures are aligned with the optical axis, the baffles of the carriages not in use thereby coacting to eliminate stray light and resultant internal reflection problems.

24. A photographic printer including a lamp, a film transport positioned over the lamp and coacting with the lamp to define an optical axis, a photographic paper drive positioned over the film transport and a lens deck positioned between the film transport and the photographic paper drive, characterized in that the lens deck includes a plurality of lens carriages mounted at respective levels on the optical axis for translatory movement in parallel directions generally normal to the optical axis and each including a plurality of laterally spaced lens assemblies movable in response to the translatory movement of the respective lens carriage successively into alignment with the optical axis, the laterally spaced lens assemblies on each carriage being positioned at varying levels with respect to the optical axis so that translatory movement of a lens carriage moves successive lens assemblies on the carriage into alignment with the optical axis at successively varying levels with respect to the optical axis.

25. A photographic printer according to claim 24, wherein the laterally spaced lens assemblies on each carriage are positioned at successively higher or successively lower levels with respect to the optical axis so that translatory movement of a lens carriage moves successive lens assemblies on the carriage into alignment with the optical axis at successively higher or successively lower levels with respect to the optical axis.

* * * * *